May 21, 1957 — R. B. JOHNSON — 2,792,891
RECORD PUNCHING MACHINE
Filed Dec. 24, 1953 — 5 Sheets-Sheet 1

INVENTOR.
REYNOLD B. JOHNSON
BY William Lang
ATTORNEY

INVENTOR.
REYNOLD B. JOHNSON
BY William Lang
ATTORNEY

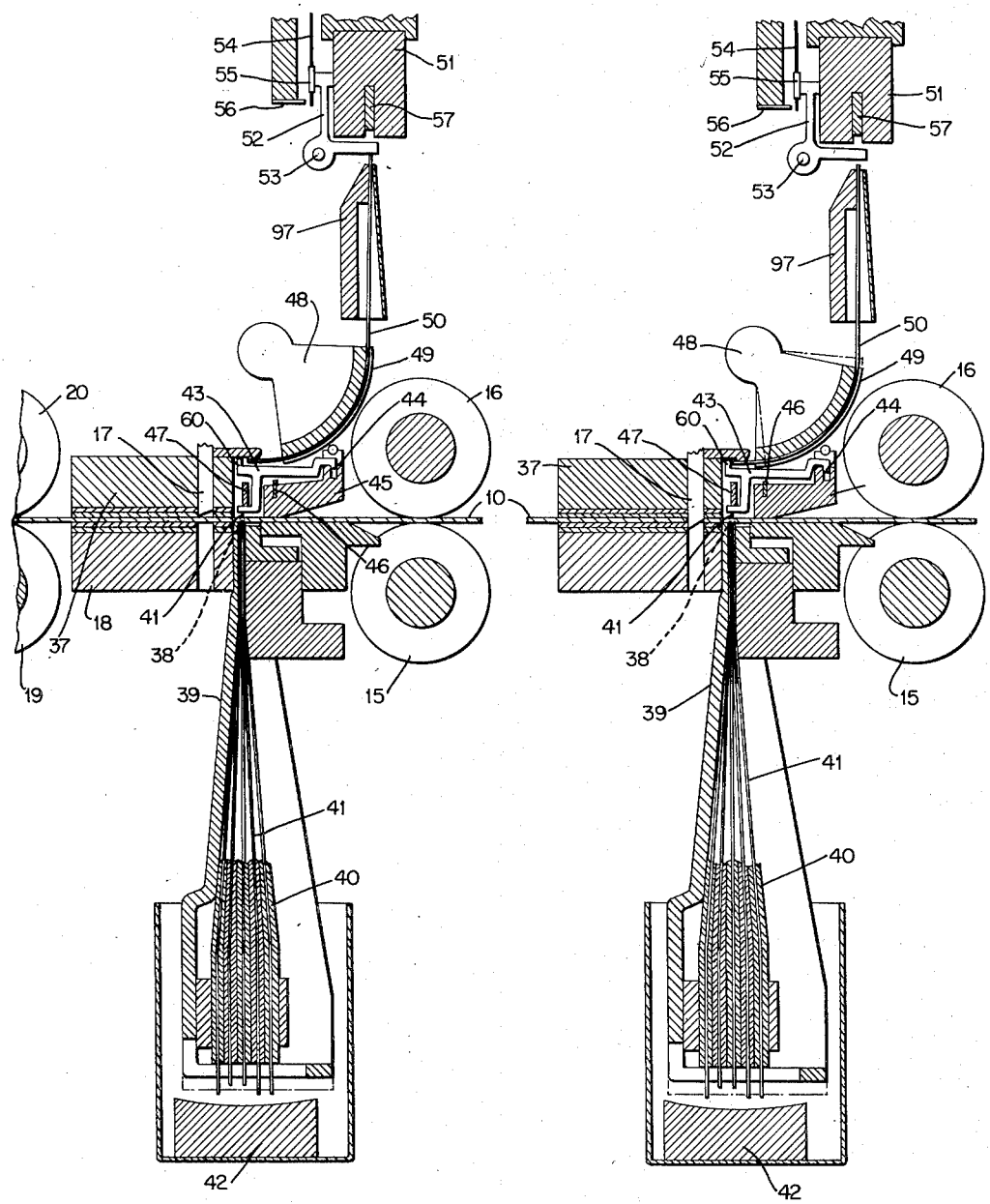

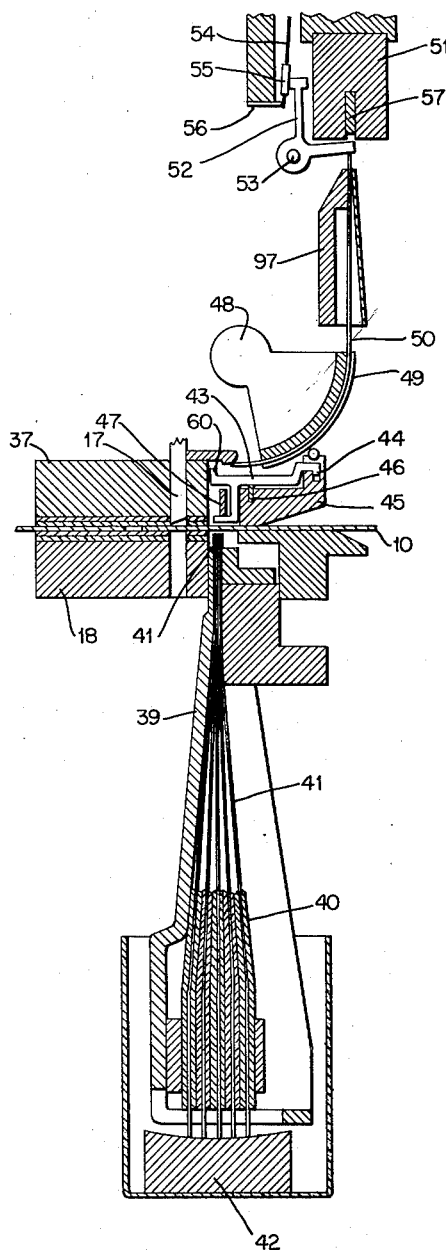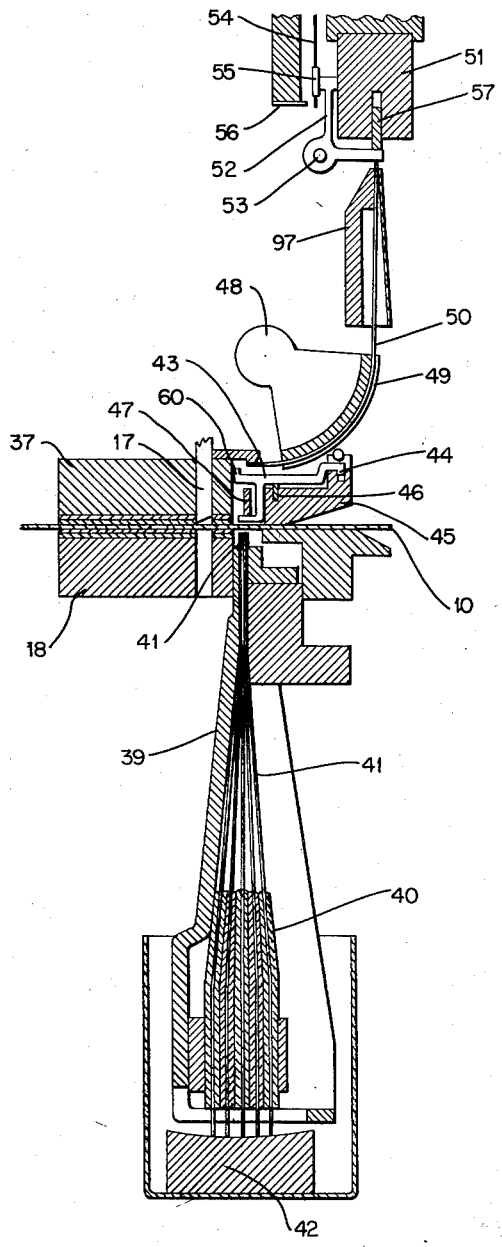

May 21, 1957 R. B. JOHNSON 2,792,891
RECORD PUNCHING MACHINE
Filed Dec. 24, 1953 5 Sheets-Sheet 5

INVENTOR.
REYNOLD B. JOHNSON
BY
William Lang
ATTORNEY

United States Patent Office 2,792,891
Patented May 21, 1957

2,792,891

RECORD PUNCHING MACHINE

Reynold B. Johnson, Palo Alto, Calif., assignor to International Business Machines Corporation, New York, N. Y., a corporation of New York Application December 24, 1953, Serial No. 400,277

7 Claims. (Cl. 164—115)

The invention relates to a machine for perforating record cards and more particularly to a perforating machine wherein differentially positioned indicia are sensed on successive record cards for effecting punching thereon in positions corresponding to the sensed indicia.

The disclosed embodiment of the invention relates to a card perforating machine wherein unusually small holes in successive record cards are sensed with a bundle wire sensing device for effecting the perforations of normal size holes thereon.

In order to effect the perforation of the record cards from the sensed indicia, the present invention is proposed and disclosed as an auxiliary device, which an be used in a well known type of high speed reproducing perforating machine described in Reissue U. S. Patent 21,133, granted to C. D. Lake, June 27, 1939.

Prior machines of this nature which used indicia on record cards to effect perforations thereon involved the storage of the sensed data for a number of cycle points before punching was effected.

In the disclosed embodiment of the invention the sensing device and control device actuated thereby are so related to the punching device that sensed data is perforated in the corresponding index point positions one cycle point after the data is sensed. The relationship between the sensing device, control device and punching device is such that no storage device is necessary. All elements of each device perform their functions and are completely restored during every cycle point of machine operation.

In order to effect the perforation of the sensed data on the record card an improved control device is proposed. The device comprises an arcuate member and a blade frictionally held along a quadrant of said arcuate member. The arcuate member and blade are rocked between the sensing means and transferable electric contacts in such a manner that the sensing of indicia on the record card will produce a displacement between the arcuate member and the blade and thereby will effect a transferring of the electric contacts.

In the present embodiment of the invention the unusually small holes are sensed using a bundle wire record sensing device which actuates a separately mounted pivotable interposer to effect a displacement between the arcuate member and frictionally held blade.

Accordingly, an object of the invention is to provide a card perforating machine, whereby unusually small holes on record cards are sensed for effecting perforation of the sensed records in accordance with the sensed data.

Another object of the invention is to provide a card perforating machine in which sensed indicia on record cards is perforated thereon in corresponding index point positions one cycle point after the indicia is sensed.

Another object of the invention is to provide a card perforating machine for converting sensed indicia on the record card to corresponding perforations thereon without the use of a storage device.

Another object of the invention resides in the provision for an improved control device which is operated to control the perforating operations in accordance with the sensed indicia.

Other objects of the invention will be pointed out in the following description and claims and illustrated in the accompanying drawings, which disclose, by way of examples, the principle of the invention and the best mode which has been contemplated of applying that principle.

In the drawings:

Fig. 3 is an enlarged sectional detail of the sensing and control devices showing the pins of the sensing device sensing a hole in the record card.

Fig. 4 is a view similar to 3 showing the action of the rocker member of the control device after the hole is sensed.

Fig. 5 is a view similar to 3 showing the resultant position of the control device due to the sensing of a hole in record card.

Fig. 6 is a view similar to 3 showing both the sensing and control devices in their normal restored position.

Figure 1:
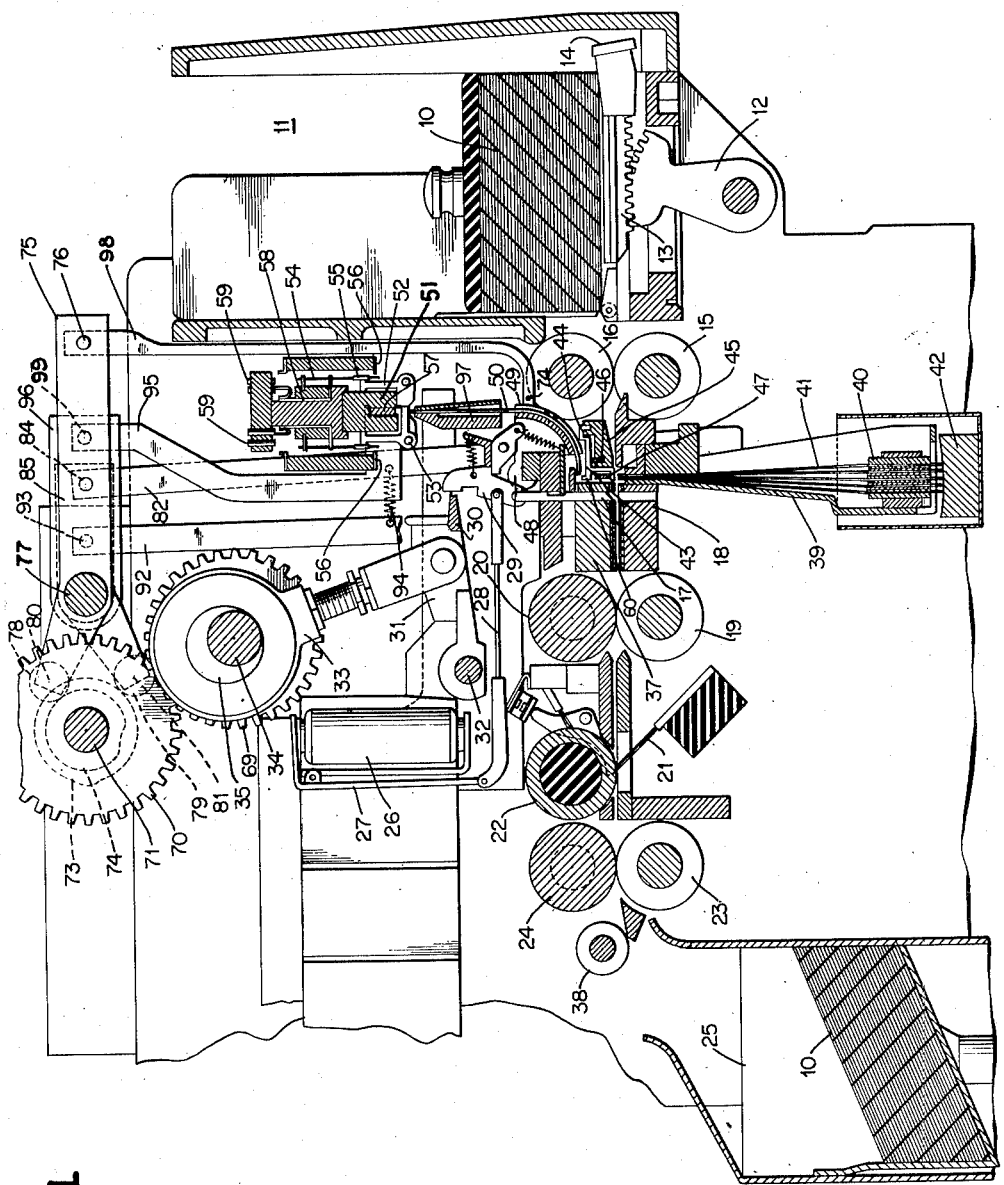
Fig. 1 is a sectional elevation of the machine showing the feeding, sensing, control and perforating devices.
Figure 2:
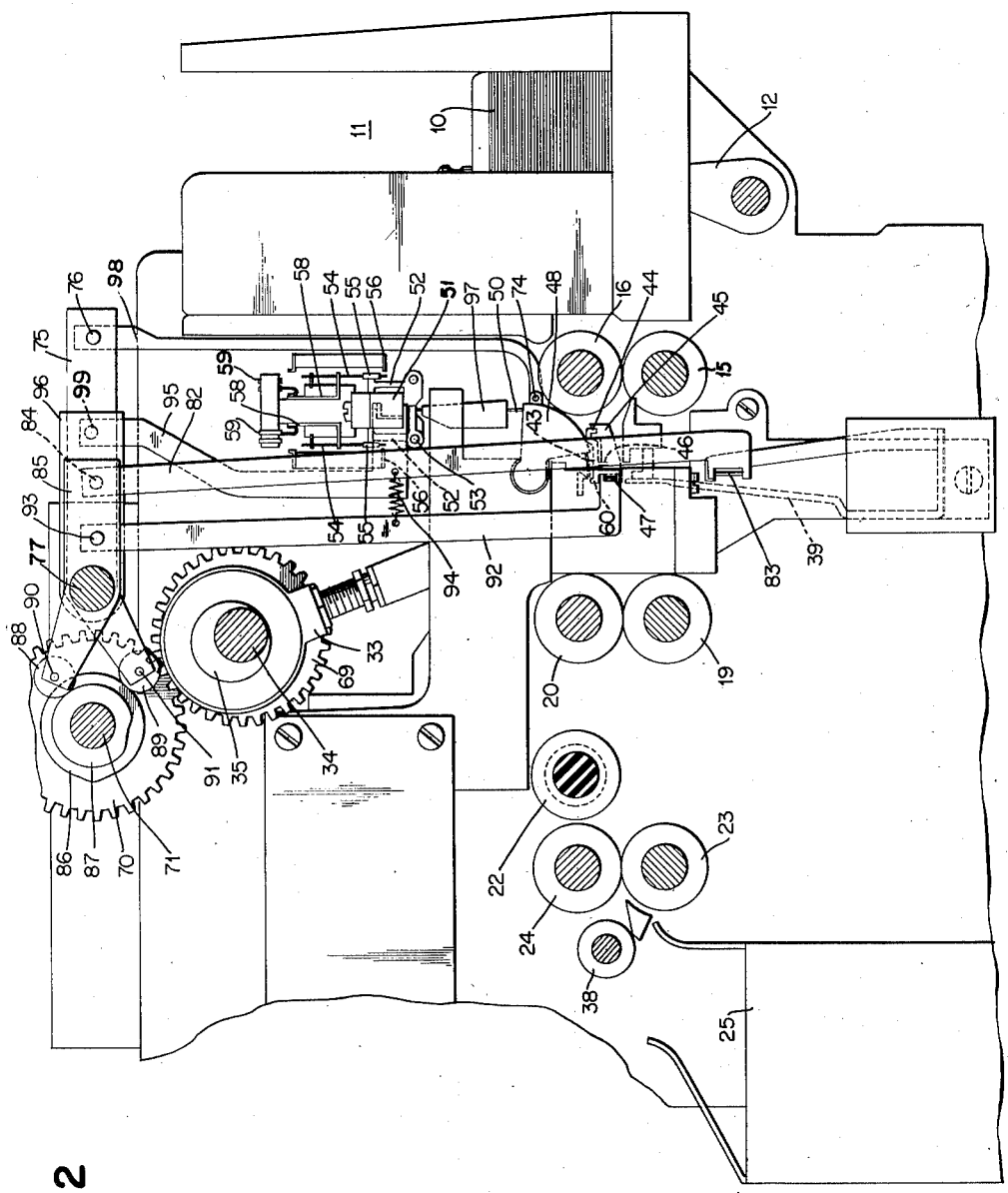
Fig. 2 is an elevation of the machine showing the driving mechanisms for the sensing and control devices.

In Figs. 1 and 2 there are shown the essential elements of the punching section of a well known type of reproducing perforating machine in which record cards 10 are successively fed from a hopper 11 by an oscillating arm 12, reciprocating slide 13 carrying a picker 14 to a pair of feed rolls 15 and 16 which convey the individually fed card 10 to and past the punching station; comprising a row of punches 17, a stripper 37 and a die 18. Feed rolls 19 and 20 then convey the card to a sensing station comprising brushes 21 and a contact roll 22. From the sensing station the card 10 is conveyed by feed rolls 23 and 24 and stacker roll 38 to the discharge hopper 25.

The rolls 15, 16, 19, 20, 23, 24 and 38 which convey the cards 10 through the part of the machine shown are intermittently driven so that the card 10 is advanced in steps with each row of index point positions pausing momentarily in the punching positions to receive a perforation thereon if at such time the magnet 26 is energized.

Energization of said magnet 26 will rock its armature structure 27 drawing a link 28 to the left to effect the coupling of an interposer 29 with a plate 30. The plate 30 is carried by member 31 pivoted at 32 and oscillated by means of link 33 connected to the twin eccentric shafts 34 and 35, which are connected to and driven by a gear not shown. When magnet 26 is energized the motion of the twin eccentric shafts 34 and 35 is transmitted to the punch as follows. The motion of the shafts 34 and 35 will oscillate link 33. The oscillation of link 33 is transmitted through member 31 and plate 30 to the interposer 29 coupled to plate 30. The punch 17 is pivotally connected to interposer 29 and is guided in a vertical stripper 37 and die 18 so that the oscillatory motion of the interposer 29 will reciprocate punch 17 into and out of the die 18 thus effecting a perforation at the index point position of a record card 10 present at the punching station at this time.

It is deemed sufficient for the purpose of this invention to state that the twin eccentric shafts 34 and 35 are continuously running and that the oscillating arm 12 and the various rollers 15, 16, 19, 20, 23, 24 and 38 are operated, under the control of a suitable clutch (not shown) by a driving mechanism (not shown) operating synchronously with the twin eccentric shafts 34 and 35.

The description up to this point relates solely to the prior art machine described in greater detail in the aforementioned reissue patent which can be referred to for a fuller description of the driving mechanism of the machine, and the starting and operating control elements and circuits which render the mechanism which will be referred to, hereinbelow, continuously running.

Figure 9:
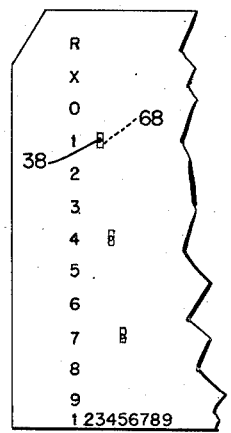
Fig. 9 is a detail view showing a portion of the record card.

In the description to follow, the record cards 10 containing the indicia represented by unusually small holes 38, as shown in Fig. 9, are placed in the hopper 11 and successively fed therefrom by the reciprocating slide 13 and picker 14 to the feed rolls 15 and 16. These record cards 10 are then fed by said feed rolls 15 and 16 past a sensing station. The sensing station is physically located in the machine before the punching station, the distance between the punching station and sensing station being equal to the distance between index point positions on a record card 10.

As shown in Figs. 1, 2 and 6, the said sensing station comprises a wire holder 39 fitted with a number of tapered wafers 40 clamped rigidly to the wire holder 39, a row of groups of wires 41 frictionally held in the wafers 40, a stationary reset bar 42, a row of interposers 43 freely pivoted at 44 in an interposer support comb 45, a stop bar 46 and a reset bail 47.

An improved control device is located above the sensing station which control device comprises a rocker unit and a contact unit. The rocker unit comprises a comb 97, a rocker 48 containing a row of rectangular channels 49, and a row of settable blades 50 frictionally held along a quadrant of the rocker 48 in the rectangular channels 49. The rocker 48 is arcuate in form and the blades 50 are flat before being assembled in the rectangular channels 49 of the rocker 48. After assembly the curvature in the rectangular channels 49 of the rocker 48 deflects the blades 50 applying to blades 50 a bending moment and causing a frictional force between the blades 50 and the walls of the channels 49. The contact unit is located above the rocker unit. The contact unit comprises an interposer bar 51, a row of interposers 52, pivoted at 53, a contact bar 56, an interposer reset bail 57, contact wire insulators 55 mounted on a row of contact wire springs 54 attached to a row of contact wire holders 58, and connecting plugs 59.

Fig. 3, 4, 5 and 6 show in detail the progressive steps of operation of the sensing and control devices. Fig. 6 shows all elements of these devices in their restored or normal position.

In Fig. 3, there is shown a record card 10 with a pierced small hole 38, as in Fig. 9, at the index point position present at the sensing station. The wire holder 39 and the wafers 40 rigidly clamped thereto have been raised to bring the wires 41 frictionally held in the wafers 40 against the record card 10. Those wires 41 coming into contact with the card 10 will slide in their respective channels as the wire holder 39 and wafers 40 continue upward. Those wires 41, of the related group, which are in alignment with the pierced hole 38 in the card 10 will continue to move upward through the said hole 38. Thus a wire 41, or wires 41, which are in alignment with the hole 38 will be raised through the hole 38 and will pivot the related interposer 43. The restoring bail 47 is moved upward in conjunction with the wire holder 39 allowing the pivoting of the interposer 43.

As shown in Fig. 4, the rocker 48 and the frictionally held blades 50 have been rocked in a clockwise direction to bring the related blade 50 against the ear 60 of the pivoted interposer 43. The rocking motion is sufficient so that the action of the pivoted interposer 43 against the related blade 50 will effect a displacement between said blade 50 and the rocker 48.

As shown in Fig. 5, the rocker 48 and frictionally held blades 50 are rocked back in a counterclockwise direction. Since the blade 50 has been displaced from its original position with respect to the rocker, the counterclockwise rotation has moved the displaced blade 50, as guided by the comb 97 against the related interposer 52 pivoting said interposer 52 around the pivot 53. The pivoting of said interposer 52 has caused the displacement at the insulator 55 of the related contact wire spring 54 against the contact bar 56. Thus an electric circuit has been completed from the common contact bar 56, through the contact wire spring 54 and, as shown in Fig. 1, the contact wire holder 58 to the plug connector 59.

Also referring to Fig. 5, the wire holder 39, attached wafers 40, and frictionally held wires 41 have been returned downward to their original position. During the downward travel, the wires 41 which did not extend through a hole in the card 10, and thus were displaced in their channels, have been brought into contact with the stationary reset bail 42 and thus have been returned to their original position. The restoring bail 47 has also been moved downward in conjunction with the wire holder unit and thus has been moved against the pivoted interposer 43 restoring said interposer 43 to its original position against the stop bar 46.

As shown in Fig. 6, the reset bail 57 has been moved downward against the pivoted interposer 52 restoring said interposer 52 to its original position against the interposer bar 51. The restoring of said interposer 52 has moved the related blade 50 back to its original position in the rocker 48. Also the restoring of the interposer 52 allows the contact wire spring 54, through its spring action, to move away from the contact bar 56 to its original position.

If there is no pierced hole present at the related index position, none of the related group of wires 41 will extend through the record card 10 and the related interposer 43 will remain as shown in Fig. 6. When the rocker 48 and blades 50 are rocked in a clockwise direction, the related blade 50 will pass over the ear 60 of the interposer 43. Thus no displacement will be effected between the rocker 48 and the blade 50. The return counterclockwise motion will then not effect the related interposer 52 and the related contact wire spring 54 will remain as shown in Fig. 6. Therefore, no electric circuit will be completed if there is no hole in the card.

Figure 8:
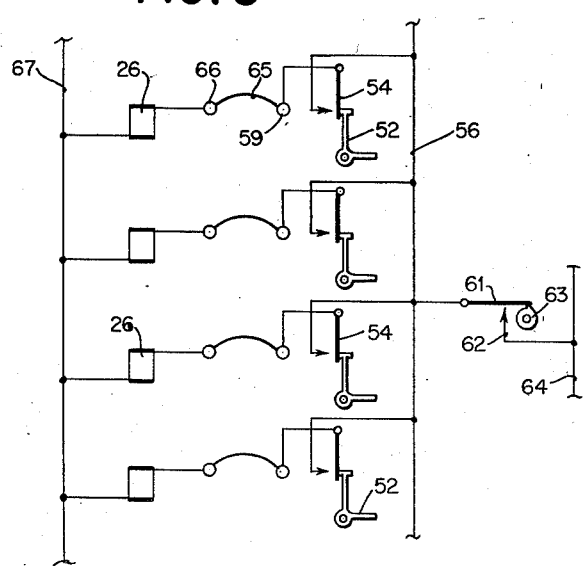
Fig. 8 is a circuit diagram for the machine.

Fig. 8 illustrates how the transferring of a contact wire spring 54 against the contact wire bar 56 can effect the energization of the related magnet 26 and thus a perforation of a normal sized hole 68 in the record card 10 as shown in Fig. 9. At the time when the contacts 61 and 62 have been closed by a circuit breaker cam 63, a circuit will be completed from one side of the line 64 through the contacts 61 and 62 to the contact bar 56, through the transferred contact wire spring 54 and wire holder 58 to the plug connector 59, through a plug wire 65 to plug connector 66 and through the related magnet 26 to the other side of the line.

Figure 7:
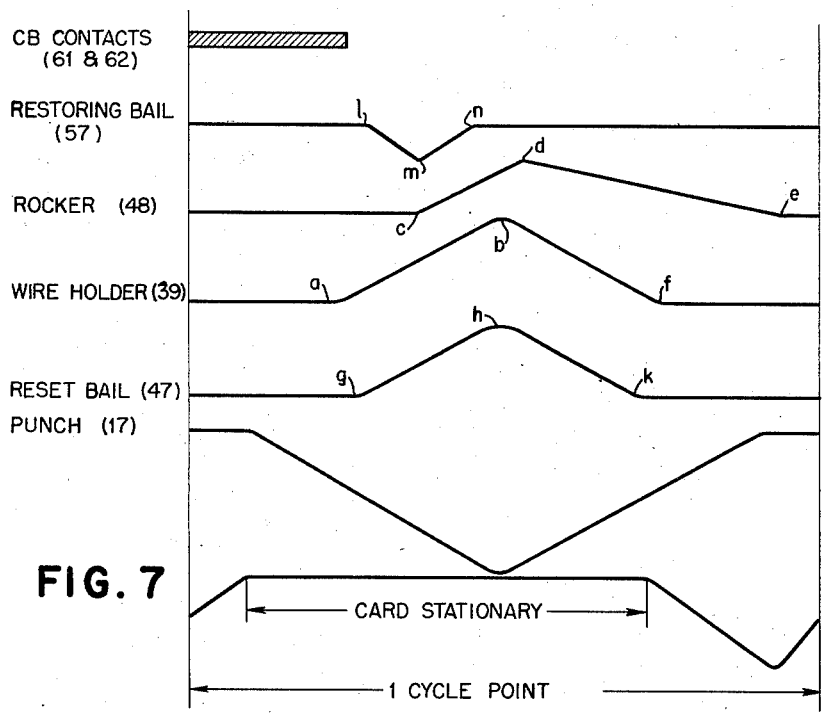
Fig. 7 is a timing chart for the machine.

In Figs. 1 and 2, there are shown the driving mechanisms for the sensing control devices and in Fig. 7 is shown a mechanical timing chart relating these motions to each other, to the timed impulse through the circuit breaker contacts 61 and 62, to the reciprocating motion of the punches 17, and to the intermittent motion of the record card 10 during one cycle point of machine operation.

In Figs. 1 and 2 there is shown a gear 69 which is pinned to shaft 34. A gear 70 is driven by gear 69 which gear 70 is pinned to cam shaft 71, to which shaft 71 are attached a number of pairs of complementary cams 73, 74, 86, 87 and others not shown. As heretofore shown the twin eccentric shafts 34 and 35 operate the punching mechanism and are in synchronism with the operation of the card feeding mechanism. Thus the action of the cams attached to shaft 71 will be synchronous with the operation of the punching and feeding mechanism.

As shown in Fig. 1, the rocker 48 receives its motion through a link 98 pivotally connected to the rocker 48 at 74. The link 98 is pivotally connected to an arm 75 at 76. The arm 75 pivots freely on crossover shaft 77 and is driven by the action of a pair of complementary cams 73 and 74, attached to shaft 71, upon the cam followers 78 and 79, which cam followers are connected to arm 75 at 80 and 81.

The wire holder 39 receives its motion through the identical links 82 connected yoke fashion about two rectangular bails 83 attached to either end of the wire holder 39. In Fig. 2, one of the links 82 is shown to be pivotally connected at 84 to arm 85. The arm 85 pivots freely on crossover shaft 77 and is driven by the action of a pair of complementary cams 86 and 87, attached to shaft 71, upon the cam followers 88 and 89 which cam followers are connected to arm 85 at 90 and 91. A like mechanism, not shown, is provided to impart an identical motion to the other of the identical links.

The reset bail 47 receives its motion through two identical links 92 which are yoke connected about either end of the reset bail 47. Both of these links 92 are moved in an identical manner. As shown in Fig. 2, one of these links 92 is pivotally connected to arm 85 at 93. The movement of the reset bail 47 is thus in phase with the motion of the wire holder 39 both being driven through the motion of arm 85. Springs 94 are attached between the links 82 and 92 to keep said links 82 and 92 yoked to their respective bails 83 and 47.

The restoring bail 57 receives its motion through two identical links 95 which are yoke connected about either end of the restoring bail 57. The links 95 are pivotally connected to identical arms 96 at 99. The arms 96 freely pivot about crossover shaft 77 and are driven by the action of two identical pairs of complementary cams and cam followers not shown.

Fig. 7 illustrates the mechanical timing of the mechanisms during one cycle point of machine operation. The timing is the same during every cycle point of every record card 10 which is fed through the machine.

Consider as before stated an index point position of a record card 10 being fed past the sensing station. If at the beginning of the cycle point under consideration all the elements of the sensing and control devices are in a normal or restored position, as shown in Fig. 6, the impulse through the contacts 61 and 62 of the circuit breaker 63 at the beginning of the cycle point will not effect the energization of any magnet 26. Thus no perforation will be made in the record card 10 during this cycle point. If as heretofore shown there is a pierced hole 38 at the index point position passing the sensing station, the upward movement (a—b in Fig. 7) of the wire holder 39 will cause one or more of the related group of wires 41 to pass through the pierced hole 38. As this is happening the clockwise motion (c—d) of the rocker 48 is begun. This motion of the rocker 48 will bring a blade 50 against the interposer 43 pivoted by wires 41 extending through the hole 38 in the record card 10. The motion (d—e) of the rocker 48 and displaced blade 50 back to the original position will pivot the interposer 52 and thus effect the transfer of the contact wire spring 54. While this is occurring the wire holder 39 is moved (b—f) back to its original position and thus any wires 41 which came into contact with the card 10 will be reset against the stationary reset bail 42. The upward motion (g—h) of the reset bail 47 moving in phase with the wire holder 39 allows the interposer 43 to be pivoted by those wires 41 which pass through the pierced hole 38 on the upward motion (a—b) of the wire holder 39. The subsequent motion (h—k) of the reset bail 47 back to its original position will restore the interposer 43 against the stop bar 46.

Thus during the cycle of operation considered, the sensing of a hole 38 at the index point position of the record card 10 has effected a transfer of the related contact wire spring 54 against the contact bar 56. The sensing device has sensed the pierced hole 38 and has been restored completely to be ready to perform its function during the next cycle point of machine operation.

At the beginning of the next cycle point of operation when contacts 61 and 62 are closed by cam 63, a circuit will be completed through the transferred contact wire spring 54 to energize the related magnet 26 as shown in Fig. 8. As heretofore shown, this will effect a coupling of the related interposer 29 with the plate 30 and thus during this cycle point the related punch 17 will perforate the record card 10 with a normal size hole 68. Since the sensing device is located a distance of one cycle point before the punching station, this perforation will be made at the same index point position which was sensed during the previous cycle point. As shown in Fig. 7, after the circuit breaker contacts 61 and 62 open the downward motion (l—m) of the restoring bail 57 is begun. This motion of the restoring bail 57 will restore the interposer 52 against the interposer bar 51. The restoring of the interposer 52 will return the related blade 50 to its original position in the rocker 48 and also allow the contact wire spring 54 to return to its original position away from the contact bar 56. As shown in Fig. 7, this motion (l—m) of restoring bail 57 is completed before the beginning of the clockwise movement (c—d) of the rocker 48 and thus the related blade 50 has been made available again to indicate whether or not a hole 38 is sensed in the related index point position during this cycle point of machine operation. The motion (m—n) of the restoring bail 57 back to its normal position away from the interposer 52 is completed before the counter-clockwise motion (d—e) of the rocker 48 is initiated. Thus the related interposer 52 and contact wire spring 54 is available again to indicate whether or not the related blade 50 has been displaced during this cycle point of machine operation.

These operations are repeated during every cycle point as record cards 10 are fed through the machine. Any pierced holes 38 at any index point positions of any column of the record card 10 can be thus sensed and effect the perforation of normal sized holes 68 at the sensed index point positions one cycle point after the sensing thereof.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a cyclically operable perforating machine, a sensing station, a perforating station, means for feeding a record bearing indicia in index point positions to present the successive index point positions on successive cycles at said stations, said stations being so spaced apart that as each index point position is presented at said perforating station the preceding index point position is presented at said sensing station, a device at said sensing station for sensing the successive index point positions during successive cycles of the machine, control means including mechanism settable each cycle by said sensing device according to the presence or absence of indicia in the index point position sensed that cycle, a perforating device at said perforating station controllable each cycle by said control means to perforate each index point position according to the indicia sensed in that position during the previous cycle, and means operable each cycle after control of said perforating device by said control means to completely restore said control means and render said included settable mechanism again responsive to setting by said sensing device according to the presence or absence of indicia in the index point position sensed that cycle.

2. In a cyclically operable perforating machine; a device for sensing successive index point positions of a record bearing indicia therein, during successive cycles of the machine; a device actuable to perforate successive index point positions of said record during successive cycles of the machine, means for feeding said record to present the index point positions to said devices, said devices being so spaced apart that as each index point position is presented to the perforating device the succeeding index point position is presented to said sensing device, control means responsive to setting by said sensing device sensing indicia present in the index point position presented thereto during any one of said cycles for actuating said perforating device to perforate the sensed index point position during the succeeding cycle, and means operable each cycle subsequent to the actuation of said perforating device for resetting said control means to render said means again responsive to setting by said sensing device sensing indicia in the index point position presented thereto during said succeeding cycle.

3. In a cyclically operable perforating machine; a sensing device for sensing successive index point positions of a record bearing indicia therein, during successive cycles of the machine; a perforating device actuable to perforate successive index point positions of said record during successive cycles of the machine, means for feeding said record to present the index point positions to said devices, said devices being so spaced apart that as each index point position is presented to said perforating device the succeeding index point position is presented to said sensing device, a control device normally ineffective to actuate said perforating device but settable each cycle to be effective to actuate said perforating device on the succeeding cycle, a displaceable blade intermediate said sensing device and said control device, and means operable each cycle for causing coaction between one end of said blade and said sensing device to displace said blade and thereby render its other end effective to set said control device according to the indicia sensed that cycle.

4. In a cyclically operable perforating machine; a bundle wire sensing device for sensing successive index point positions of a record bearing indicia therein, during successive cycles of the machine; a perforating device actuable to perforate successive index point positions of said record during successive cycles of the machine, means for feeding said record to present the index point positions to said devices, said devices being so spaced apart that as each index point position is presented to said perforating device the succeeding index point position is presented to said sensing device, a control device normally ineffective to actuate said perforating device but settable each cycle to be effective to actuate said perforating device on the succeeding cycle, a rockable arcuate member, a displaceable blade carried thereon, one end of said blade extending toward said sensing device, the other end extending toward said control device, and means operable each cycle to first rock said member toward said sensing device to cause coaction between said one end of the carried blade and the wires of said sensing device to displace the blade on the member and to subsequently rock said member toward said control device to cause said other end of the carried blade to set said control device according to the indicia sensed.

5. In a cyclically operable perforating machine; a bundle wire sensing device for sensing successive index point positions of a record bearing indicia therein, during successive cycles of the machine; a perforating device actuable to perforate successive index point positions of said record during successive cycles of the machine, means for feeding said record to present the index point positions to said devices, said devices being so spaced apart that as each index point position is presented to said perforating device the succeeding index position is presented to said sensing device, a control device normally ineffective to actuate said perforating device but settable each cycle to be effective to actuate said perforating device on the succeeding cycle, a rockable arcuate member, a displaceable blade carried thereon, one end of said blade extending toward said sensing device, the other end extending toward said control device, means operable each cycle to first rock said member toward said sensing device to cause coaction between said one end of the carried blade and the wires of said sensing device to displace the blade on the member and operable to subsequently rock said member toward said control device to cause said other end of the carried blade to set said control device according to the indicia sensed, and means operable each cycle subsequent to actuation of said perforating device according to the indicia sensed the preceding cycle and prior to operation of said rockable member to reset both said control device and said blade on said member to render said blade effective each cycle to be displaced and said contact device to be set according to the indicia sensed.

6. In a cyclically operable perforating machine, a sensing station, a perforating station, means for feeding a record bearing indicia in index point positions to present the successive index point positions on successive cycles at said stations, said stations being so spaced apart that as each index point position is presented at said perforating station the preceding index point position is presented at said sensing station, perforating means at said perforating station, said perforating means when controlled during a first portion of one of said cycles being effective during a second portion of that cycle to perforate the index point position of the record presented that cycle at said perforating station, means at said sensing station effective during said second portion of each cycle to sense indicia in the index point position presented that cycle at said sensing station, control means intermediate said sensing and perforating means settable by said sensing means during said second portion of a first one of said cycles for controlling said perforating means during said first portion of the succeeding cycle, and means operable after said first portion of said succeeding cycle for restoring said control means to render said means again responsive to setting by said sensing means during said second portion of said succeeding cycle.

7. In a cyclically operable perforating machine, a sensing station, a recording station, means for feeding a record bearing indicia in index point positions to present the successive index point positions on successive cycles at said stations, said stations being so spaced apart that as each index point position is presented at said recording station the preceding index point position is presented at said sensing station, means at said sensing station for sensing the successive index point positions during successive cycles of the machine, control means settable each cycle by said sensing means according to the indicia sensed that cycle, means at said recording station controllable each cycle by said control means to record in each index point position according to the indicia sensed in that position during the previous cycle, and means operable each cycle to completely restore said control means to thereby render said means again responsive to setting by said sensing device according to the indicia sensed that cycle.

References Cited in the file of this patent

UNITED STATES PATENTS

| | | |
|---|---|---|
| 1,691,917 | Braitmayer | Nov. 20, 1928 |
| 1,882,797 | Ford | Oct. 18, 1932 |
| 2,007,391 | Bryce | July 9, 1935 |
| 2,275,396 | Johnson | Mar. 3, 1942 |
| 2,429,730 | Pitman | Oct. 28, 1947 |
| 2,454,628 | Braun | Nov. 23, 1948 |
| 2,478,275 | Johnson | Aug. 9, 1949 |
| 2,490,346 | Furman | Dec. 6, 1949 |
| 2,570,112 | Gollwitzer | Oct. 2, 1951 |